(12) United States Patent
Alperin

(10) Patent No.: US 12,505,133 B1
(45) Date of Patent: Dec. 23, 2025

(54) APPARATUS AND METHOD FOR GENERATING RESOURCE OUTPUT AS A FUNCTION OF A QUERY AND MULTIMODAL DATA

(71) Applicant: SurvivorNet, Inc., New York, NY (US)

(72) Inventor: Steven David Alperin, New York, NY (US)

(73) Assignee: SurvivorNet, Inc., New York, NY (US)

(*) Notice: Subject to any disclaimer, the term of this patent is extended or adjusted under 35 U.S.C. 154(b) by 0 days.

(21) Appl. No.: 19/191,042

(22) Filed: Apr. 28, 2025

(51) Int. Cl.
  *G06F 16/00* (2019.01)
  *G06F 16/3329* (2025.01)
  *G06F 16/3332* (2025.01)
  *G06F 16/583* (2019.01)

(52) U.S. Cl.
  CPC .... *G06F 16/3334* (2019.01); *G06F 16/33295* (2025.01); *G06F 16/583* (2019.01)

(58) Field of Classification Search
  CPC .............. G06F 16/3334; G06F 16/583; G06F 16/33295
  USPC ......................................................... 707/748
  See application file for complete search history.

(56) References Cited

U.S. PATENT DOCUMENTS

| | | | |
|---|---|---|---|
| 12,045,269 B2 | 7/2024 | Cook | |
| 2019/0385711 A1* | 12/2019 | Shriberg | G16H 15/00 |
| 2020/0077939 A1* | 3/2020 | Richer | A61M 21/02 |
| 2022/0405484 A1* | 12/2022 | Kanchibhotla | G06N 5/022 |
| 2023/0333201 A1* | 10/2023 | Regani | G01S 13/86 |
| 2024/0126794 A1* | 4/2024 | Cook | H04L 51/02 |
| 2025/0094465 A1* | 3/2025 | Xu | G06F 16/383 |

FOREIGN PATENT DOCUMENTS

| | | |
|---|---|---|
| IN | 202311070678 A | 11/2023 |
| IN | 202411056117 A | 8/2024 |
| IN | 202411049753 A | 9/2024 |
| WO | 2024242745 A1 | 11/2024 |

* cited by examiner

*Primary Examiner* — Monica M Pyo
(74) *Attorney, Agent, or Firm* — Caldwell Intellectual Property Law

(57) ABSTRACT

An apparatus and method for generating resource output as a function of a query and multimodal data. The apparatus includes at least a processor and a memory communicatively connected to the at least a processor. The memory instructs the processor to receive multimodal data associated with a user profile, receive a first query of a plurality of queries, generate at least a first output of a plurality of outputs as a function of the first query and the multimodal data, wherein the plurality of outputs comprises a question data structure, wherein the question data structure comprises each output associated with a weight, generate a score associated with the at least a first output using system feedback, adjust at least the weight associated with the at least a first output, select a plurality of questions, and display the first question followed temporally by the second question.

20 Claims, 9 Drawing Sheets

APPARATUS AND METHOD FOR GENERATING RESOURCE OUTPUT AS A FUNCTION OF A QUERY AND MULTIMODAL DATA

FIELD OF THE INVENTION

The present invention generally relates to the field of artificial intelligence. In particular, the present invention is directed to an apparatus and a method for generating resource output as a function of a query and multimodal data.

BACKGROUND

Existing chatbot systems face significant challenges in context awareness, multimodal data integration, and adaptive learning, often resulting in rigid, rule-based interactions that fail to provide dynamic, contextually relevant responses. Additionally, limitations in real-time data processing, natural language understanding (NLU), and interoperability with external systems hinder their ability to deliver accurate, scalable, and personalized user experiences.

SUMMARY OF THE DISCLOSURE

In an aspect, an apparatus for generating resource output as a function of a query and multimodal data includes at least a processor and a memory communicatively connected to the at least a processor. The memory contains instructions configuring the processor to receive multimodal data associated with a user profile, wherein the multimodal data comprises passive data and active data, wherein receiving the multimodal data associated with the user profile comprises retrieving passive data using a web-crawler as a function of user data, receive, using a chatbot, a first query of a plurality of queries, generate, using the chatbot, at least a first output of a plurality of outputs as a function of the first query and the multimodal data, wherein the plurality of outputs comprises a question data structure, wherein the question data structure comprises each output associated with a weight, generate, using an evaluation model, a score associated with the at least a first output using system feedback, adjust, within the question data structure, at least the weight associated with the at least a first output, select, from the question data structure, a plurality of questions, wherein the plurality of questions comprises a first question having a highest weight within the question data structure and a successive question having a second highest weight within the question data structure, and display, using a downstream device, the first question followed temporally by the second question.

In another aspect, a method for generating resource output as a function of a query and multimodal data includes receiving, using at least a processor, multimodal data associated with a user profile, wherein the multimodal data comprises passive data and active data, wherein receiving the multimodal data associated with the user profile comprises retrieving passive data using a web-crawler as a function of user data, receiving, using a chatbot, a first query of a plurality of queries, generating, using the chatbot, at least a first output of a plurality of outputs as a function of the first query and the multimodal data, wherein the plurality of outputs comprises a question data structure, wherein the question data structure comprises each output associated with a weight, generating, using an evaluation model, a score associated with the at least a first output using system feedback, wherein the evaluation model is trained using a chatbot training dataset, wherein the chatbot training dataset comprises historical outputs associated with historical subsequent question data, adjusting, within the question data structure, at least the weight associated with the at least a first output, selecting, from the question data structure, a plurality of questions, wherein the plurality of questions comprises a first question having a highest weight within the question data structure and a successive question having a second highest weight within the question data structure, and displaying, using a downstream device, the at least a first output in a visualization.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating resource output as a function of a query and multimodal data. The apparatus includes at least a computing device comprised of a processor and a memory communicatively connected to the processor. The memory instructs the processor to receive multimodal data associated with a user profile, wherein the multimodal data comprises passive data and active data, wherein receiving the multimodal data associated with the user profile comprises retrieving passive data using a web-crawler as a function of user data. The processor receives, using a chatbot, a first query of a plurality of queries. The processor generates, using the chatbot, at least a first output of a plurality of outputs as a function of the first query and the multimodal data, wherein the plurality of outputs comprises a question data structure, wherein the question data structure comprises each output associated with a weight. The processor generates, using an evaluation model, a score associated with the at least a first output using system feedback. The processor adjusts, within the question data structure, at least the weight associated with the at least a first output. The processor selects, from the question data structure, a plurality of questions, wherein the plurality of questions comprises a first question having a highest weight within the question data structure and a successive question having a second highest weight within the question data structure. The processor displays, using a downstream device, the first question followed temporally by the second question.

Figure 1:
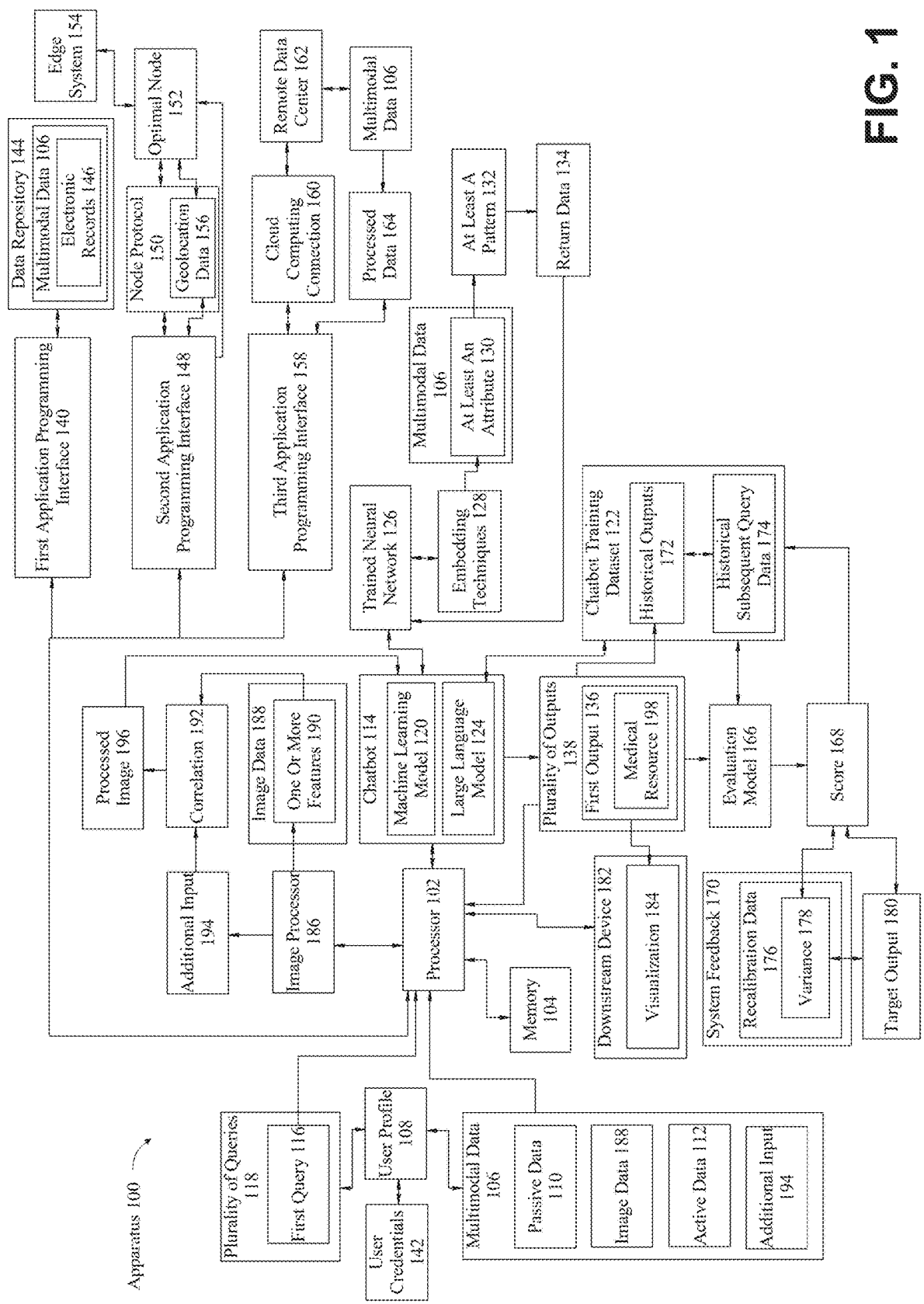
FIG. 1 is a block diagram of an apparatus for generating resource output as a function of a query and multimodal data.

Referring now to FIG. 1, an exemplary embodiment of apparatus 100 for generating resource output as a function of a query and multimodal data is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 102. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive multimodal data 106 associated with a user profile 108, wherein the multimodal data 106 comprises passive data 110 and active data 112, wherein receiving the multimodal data 106 associated with the user profile 108 comprises retrieving passive data using a web-crawler as a function of user data. As used in this disclosure, "multimodal data" is data that originates from multiple distinct sources or modalities. In an embodiment, multimodal data 106 may include information from various modalities where each modality represents a different type or form of data. For example, these modalities may include, without limitation, textual data, images, audio signals, video recordings, sensor readings, or other structured or unstructured data formats. Without limitation, multimodal data 106 may encompass datasets that integrate and correlate information from these various modalities to enhance analysis, decision-making, pattern recognition, and the like. In a non-limiting example, multimodal data 106 may include text-based information such as medical charts, voice data from patient consultations, image data 188 such as x-rays, and the like. These diverse data types can be processed together to improve medical diagnostics, enhance predictive analytics, or facilitate more comprehensive patient assessments. In another non-limiting example, the apparatus 100 with multimodal capabilities can analyze speech recordings of a doctor's observations, extract relevant insights from written medical records, cross-reference them with diagnostic images to generate a more accurate clinical evaluation, and the like.

With continued reference to FIG. 1, as used in this disclosure, a "user profile" is a structured dataset that represents information associated with a specific user. In an embodiment, the user profile 108 may include personal attributes, preferences, historical interactions, relevant contextual data, and the like. Without limitation, the user profile 108 may include demographic details, behavioral patterns, health records, system interaction history, inferred insights derived from passive and active data 112 sources, and the like. In a non-limiting example, the user profile 108 may store a patient's medical history, prior diagnoses, prescribed medications, chat interactions with a healthcare system, and the like. In another non-limiting example, the user profile 108 can be dynamically updated with new test results, medication instructions, lifestyle recommendations, and the like, enabling more accurate and personalized decision-making in a machine-learning-driven healthcare system.

With continued reference to FIG. 1, as used in this disclosure, "passive data" is data that is collected or generated without direct user input or active engagement. In an embodiment, the passive data 110 may be derived from historical records, background monitoring, automated classifications, and the like. Passive data 110 may include, without limitation, chat history with a user, automated classification of medical trends, concerns, diagnoses, threats, emergencies, and the like which may indicate when professional aid should be sought. As used in this disclosure, "active data" is data that a user directly receives or interacts with. In an embodiment, the active data 112 may include intentional actions or engagement with a professional or the apparatus 100. For example, active data 112 may include, without limitation, test results, medication instructions, educational pamphlets, other information provided by health professionals. In a non-limiting example, passive data 110 such as prior medical inquiries and chat interactions can be analyzed to identify emerging health concerns. In another non-limiting example, active data 112 such as laboratory results and prescribed treatment plans can be used to update a user profile 108, refine machine-learning models, enhance the training data of large language models (LLMs) to improve personalized recommendations, and the like.

With continued reference to FIG. 1, as used in this disclosure, a "web crawler" is a program that systematically browses the internet for the purpose of Web indexing. In a non-limiting example, the web crawler may be seeded with platform URLs, wherein the web crawler may then visit the next related URL, retrieve the content, index the content, and/or measures the relevance of the content to the topic of interest. In some embodiments, processor 102 may generate the web crawler to compile the training data with uploaded data. In a non-limiting example, the web crawler may be seeded and/or trained with a reputable website, to begin the search. In another non-limiting example, the web crawler may be generated by a processor 102. In some embodiments, the web crawler may be trained with information received from a user through a graphical user interface. In some embodiments, the web crawler may be configured to generate a web query. For example, without limitation, a web query may include search criteria received from a user. For example, a user may submit a plurality of websites for the web crawler to search to extract entity records, inventory records, pricing records, product records, customer records, financial transaction records, customer feedback and review records, and the like.

Still referring to FIG. 1, processor 102 is configured to receive, using a chatbot 114, a first query 116 of a plurality of queries 118. As used in this disclosure, a "chatbot" is an automated software application designed to process and generate natural language responses in real-time, enabling interactive communication between a user and a system. The chatbot 114 may include, without limitation, rule-based or artificial intelligence-driven conversational agents that utilize natural language processing (NLP), machine learning, or predefined scripts to interpret user inputs, provide responses, and execute tasks. In a non-limiting example, the chatbot 114 may assist users by answering health-related queries based on a user profile 108, retrieving relevant medical guidelines, suggesting potential courses of action, and the like. In another non-limiting example, the chatbot 114 integrated with a healthcare system may process multimodal data 106, such as chat history, voice inputs, and medical records, to provide personalized recommendations or escalate concerns to a healthcare professional. In a non-limiting example, the chatbot 114 may appear as an interactive messaging interface within a graphical user interface. The chatbot 114 window may display a text input field where users can type their queries, along with quick-action buttons for commonly asked topics, such as "Find a Specialist," "Mental Health Support," "Dietary Recommendations," "Medication Guidance," and the like. Additionally and or alternatively, the chatbot 114 may support voice input, allowing users to speak their queries instead of typing. Continuing, the responses from the chatbot 114 may appear in a conversational format, with links to relevant resources, dynamically generated recommendations, options to connect with healthcare professionals, and the like. Without limitation, a user may ask, "What foods should I be eating for heart health?" and the chatbot 114 may respond with a list of heart-healthy foods, such as leafy greens, whole grains, and lean proteins, along with a link to a registered dietitian or a nutrition-focused community forum. In another non-limiting example, a user experiencing anxiety may ask, "Are there mental health resources available?" and the chatbot 114 may provide a list of nearby therapists, online counseling services, mindfulness exercises, and the like. Continuing the previous non-limiting example, if a user inquires, "Can you recommend a doctor specializing in diabetes near me?" the chatbot 114 may leverage location-based services to generate a list of endocrinologists, along with their contact information, patient reviews, appointment scheduling links, and the like. Without limitation, a user managing a chronic condition such as arthritis may ask, "Are there online communities for people with arthritis?" and the chatbot 114 may respond with links to discussion forums, social media groups, patient advocacy organizations, and the like. In an embodiment, without limitation, the chatbot 114 may also assist with medication-related inquiries. A patient may ask, "How should I take my new medication?" and the chatbot 114 may retrieve dosage instructions from the user's medical records or provide general guidance based on authoritative medical sources. Additionally and or alternatively, if a user asks, "What are the side effects of this medication?" the chatbot 114 may display a summarized list of common side effects along with a recommendation to consult a healthcare provider for further concerns. Without limitation, by leveraging multimodal data 106, the chatbot 114 may provide highly personalized responses based on the user profile 108, chat history, real-time interactions, and the like. Continuing, this may ensure that patient receives relevant and actionable information tailored to their health conditions and needs.

With continued reference to FIG. 1, as used in this disclosure, a "query" is a request for information submitted by a user or system to retrieve data. In an embodiment, the data may be retrieved from a database, search engine, automated processing system, and the like. The query may include, without limitation, multimodal data 106 which may include textual or voice-based inputs entered into the chatbot 114, search bar, other user interface to request responses related to specific topics, instructions, or recommendations. In a non-limiting example, a user may submit a query such as, "What are the symptoms of diabetes?" to a chatbot 114, which may then retrieve and present relevant medical information. In another non-limiting example, the apparatus 100 may automatically generate a query based on a user's health profile, such as retrieving a list of nearby cardiologists based on a detected heart condition.

With continued reference to FIG. 1, wherein the chatbot 114 may include a machine learning model 120, wherein the machine learning model 120 is iteratively trained on the chatbot training dataset 122. As used in this disclosure, a "chatbot training dataset" is a collection of data used to train the performance of a chatbot 114. In an embodiment, the chatbot training dataset 122 may provide data to enable the chatbot 114 to understand and generate natural language responses. The chatbot training dataset 122 may include, without limitation, textual dialogues, query-and-answer pairs, labeled intents, user interactions, domain-specific terminology, multimodal data 106 such as voice transcripts or contextual metadata, and the like. In a non-limiting example, a chatbot training dataset 122 may consist of historical customer support conversations, annotated with user intents and corresponding ideal responses, to improve the chatbot's ability to handle inquiries. In another non-limiting example, the chatbot training dataset 122 may include medical FAQs, symptom descriptions, and/or doctor-patient interactions to enhance its ability to provide accurate health-related guidance. The chatbot dataset is discussed in more detail below.

With continued reference to FIG. 1, wherein the chatbot 114 further comprises a large language model 124, wherein the large language model 124 is configured to receive the multimodal data 106, processes the multimodal data 106 using a trained neural network 126, wherein processing comprises extracting, using embedding techniques 128, at least an attribute 130 from the multimodal data 106, identifying, using the at least an attribute 130, at least a pattern 132 from the multimodal data 106, and generating, using the at least a pattern 132, return data 134, generate, using the return data 134, the at least a first output 136 of the plurality of outputs 138. As used in this disclosure, an "embedding technique" is a method of transforming data into a lowerdimensional vector representation that preserves semantic relationships, contextual meaning, or structural dependencies. The term "embedding technique" includes, without limitation, word embeddings (e.g., Word2Vec, GloVe, BERT embeddings), image embeddings for visual data processing, and multimodal embeddings that integrate text, audio, and image features. In a non-limiting example, a text-based chatbot 114 may use an embedding technique such as transformer-based contextual embeddings to encode user queries into a high-dimensional representation, allowing for more accurate intent recognition and semantic understanding. In another non-limiting example, an image-processing AI system may apply a convolutional neural network (CNN)-based embedding technique to extract key visual features from medical scans, enabling automated classification and anomaly detection.

With continued reference to FIG. 1, as used in this disclosure, an "attribute" is a characteristic extracted from input data that contributes to pattern 132 recognition analysis. The attribute 130 may include, without limitation, textual features, such as keywords, sentiment scores, named entities, visual properties such as, color histograms, edge features, and structured data fields such as timestamps, geographic locations, numerical values, and the like. In a non-limiting example, a chatbot 114 analyzing the plurality of queries 118 may extract the attribute 130 such as "symptom type" from a health-related question to determine relevant responses. In another non-limiting example, the chatbot 114 analyzing the plurality of queries 118 may extract the attribute 130 such as "patient type" from a health-related question to determine relevant responses. In an embodiment, the attribute 130 of "patient type" may include, without limitation, cancer patient, arthritis patient, mental health patient, and the like.

With continued reference to FIG. 1, as used in this disclosure, a "pattern" is a recurring structure, trend, or correlation identified within data that can be used for classification, decision-making, or predictive modeling. The pattern 132 may include, without limitation, temporal sequences in time-series data, linguistic structures in natural language processing, image recognition features in computer vision, and behavioral trends in user analytics. In a non-limiting example, a large language model 124 may detect a pattern 132 of sentiment changes in customer support interactions, allowing it to predict dissatisfaction and recommend escalation. In another non-limiting example, an IoT-based monitoring system may identify a pattern 132 of irregular temperature fluctuations in industrial equipment, triggering a maintenance alert.

With continued reference to FIG. 1, as used in this disclosure, a "return data" is the processed output derived from a pattern 132 that informs subsequent computations, response generation, or decision-making processes. The return data 134 may include, without limitation, predicted classifications, structured response data, extracted knowledge representations, and/or actionable insights generated by AI models. In a non-limiting example, a conversational AI system may use return data 134 such as "recommended troubleshooting steps" to assist users in resolving technical issues. In another non-limiting example, a predictive analytics platform may generate return data 134 in the form of "risk scores" for loan applications, helping financial institutions assess creditworthiness.

With continued reference to FIG. 1, apparatus 100 may include a large language model 124 (LLM). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, nonlimiting examples, medical report documents, electronic records 146, entity documents, business documents, emails, user communications, newspaper articles, blogs, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on the capability needed such as generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA).

As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Please find a doctor close to", then it may be highly likely that the word "me" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

With continued reference to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

With continued reference to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with a patient and their medical records.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Still referring to FIG. 1, processor 102 is configured to generate, using the chatbot 114, at least a first output 136 of a plurality of outputs 138 as a function of the first query 116 and the multimodal data 106 wherein the plurality of outputs 138 comprises a query data structure, wherein the query data structure comprises each output associated with a weight. As used in this disclosure, an "output" is the information generated by the apparatus 100 in response to an input. In an embodiment, the output may include without limitation, text-based responses, visual representations, audio signals, numerical values, or any other form of data conveyed to a user or another system as a result of computational processing. In a non-limiting example, the at least a first output 136 of the chatbot 114 may include a text-based answer to the first query 116, such as "Your nearest cardiologist is 2 miles away." In another non-limiting example, the at least a first output 136 of the chatbot 114 may consist of a predictive analysis, such as identifying a potential medical condition based on the first query 116 of a user data input asking, "Where is the closest cardiac specialist?" The first query 116 may originate from a user seeking medical insights, such as a patient uploading an X-ray image and asking, "What does this X-ray show?" Processor 102, leveraging the chatbot's 114 access to multimodal data 106, including image analysis models and historical medical records, may generate a at least a first output 136 such as, "The X-ray indicates a fracture in the metatarsal bone, suggesting a broken foot." In a non-limiting example, the conversation may continue with the user submitting a second query, such as "How serious is the fracture, and what should I do next?" The chatbot 114, using processor 102, may refine its response based on additional contextual data, generating a second output such as, "This type of fracture appears to be a non-displaced break, which often heals with immobilization. However, you should consult an orthopedic specialist for a full assessment and treatment plan." The chatbot 114 may further provide a list of nearby specialists, estimated recovery times, or instructions on managing pain and swelling. In another non-limiting example, a patient may initiate the first query 116 by typing, "I have a headache and blurry vision. What could be causing this?" Processor 102, analyzing past medical history, symptom databases, and user profile 108 information, may generate a at least a first output 136 such as, "Headaches with blurry vision can have various causes, including migraines, dehydration, or vision strain. If you recently sustained an injury or have underlying conditions like high blood pressure, this may require medical attention." The conversation may then progress with the patient submitting a follow-up query, such as "Should I go to the doctor or try home remedies first?" Processor 102 may generate a second output refining the chatbot's 114 response, such as, "If your symptoms persist, worsen, or are accompanied by nausea, confusion, or dizziness, you should seek immediate medical care. Otherwise, you may try resting, staying hydrated, and avoiding bright screens. Would you like recommendations for a local healthcare provider?"

With continued reference to FIG. 1, As used in this disclosure, a "query data structure" is an organized framework that stores and processes question-related information. In an embodiment, the query data structure may associate inputs, responses, or conditions with specific outputs. The query data structure may include, but is not limited to, decision trees, lookup tables, probabilistic models, rule-based logic, or machine learning classifiers, allowing for dynamic evaluation and selection of outputs based on input data. In some embodiments, the query data structure may be used to assess sensor data, system conditions, or other contextual parameters to generate state classifications or system state change signals. As used in this disclosure, a "weight" is a numerical value assigned to an output within a data structure. In an embodiment, the weight may represent the relative importance, probability, or confidence level of the associated output. The weight may include, but is not limited to, statistical probabilities, machine learning coefficients, priority rankings, or heuristic scores, which influence decision-making within the query data structure. In some embodiments, the weight may be dynamically adjusted based on real-time sensor data, historical performance, or adaptive learning models.

With continued reference to FIG. 1, wherein the at least a processor 102 may be configured to utilize a first application programming interface 140, wherein the first application programming interface 140 is configured to authenticate user credentials 142 associated with the user profile 108, access, using the authenticated user credentials 142, a data repository 144, retrieve the multimodal data 106 comprising a plurality of electronic records 146 from the data repository 144, and transmit the plurality of health records to the chatbot 114, wherein the chatbot 114 is configured to generate the at least a first output 136. As used in this disclosure, an "application programmable interface" (API) is a set of defined protocols, tools, and specifications that enable communication and interaction between different software applications, systems, or components. An API may serve as an intermediary that allows developers to access specific functionalities or data provided by a software program, service, or hardware without requiring direct access to its internal code or implementation. In a non-limiting example, an API may provide endpoints that allow a third-party application to request and retrieve information, such user account details, machine learning outputs, and the like, from a server. The API may include methods for sending data to the apparatus 100, such as uploading images, submitting queries, or executing commands. Without limitation, by abstracting the underlying complexity, APIs enable seamless integration between diverse systems and facilitate the development of modular, scalable, and interoperable software solutions. As used in this disclosure, "user credentials" are authentication data associated with a user profile 108 that grants access to a system. The user credentials 142 may include, without limitation, usernames, passwords, biometric identifiers, security tokens, multi-factor authentication (MFA) codes, cryptographic keys, digital certificates, and the like. In a non-limiting example, user credentials 142 may consist of a username and password combination required to log into a secure healthcare portal. In another non-limiting example, user credentials 142 may include a fingerprint scan and a one-time passcode (OTP) sent via SMS to verify the identity of a user accessing a financial services application. As used in this disclosure, a "data repository" is a structured storage system designed to collect, manage, and organize digital data for retrieval. The data repository 144 may include, without limitation, relational databases, NoSQL databases, cloud-based storage systems, data lakes, and distributed file systems that support structured, semi-structured, and unstructured data. In a non-limiting example, the data repository 144 may be a hospital database that stores patient records, including medical histories, diagnostic reports, prescriptions, and treatment plans. Without limitation, the data repository 144 may enable healthcare providers to access patient information efficiently, ensuring continuity of care and facilitating medical decision-making. As used in this disclosure, "electronic records" are digitally stored medical records. In an embodiment, the electronic records may include electronic health records (EHRs) that may contain a patient's health-related information. In an embodiment, a patient's health-related information may include clinical history, lab results, imaging reports, prescribed medications, and physician notes. The electronic records 146 may include, without limitation, structured medical data that is stored, managed, and shared across healthcare institutions to support patient care, regulatory compliance, and medical research. In a non-limiting example, electronic records 146 may be stored within a hospital's data repository 144, allowing the apparatus 100 and/or authorized doctors and specialists to retrieve a patient's past diagnoses, allergies, current treatments, and the like. In another non-limiting example, the data repository 144 may integrate with the apparatus 100 to enable remote healthcare providers to review patient data and provide virtual consultations.

With continued reference to FIG. 1, wherein the at least a processor 102 may be configured to utilize a second application programming interface 148, wherein the second application programming interface 148 is configured to identify, using a node protocol 150, an optimal node 152 of an edge system 154, establish a connect to the optimal node 152 of the edge system 154, process, using the optimal node 152, the multimodal data 106, generate, using the optimal node 152, the plurality of outputs 138, and transmit the plurality of outputs 138 to the downstream device 182. As used in this disclosure, a "node protocol" is a set of rules and procedures that govern how individual nodes within a network communicate, exchange data, and perform distributed processing. The node protocol 150 may include, without limitation, networking protocols, blockchain consensus mechanisms, peer-to-peer (P2P) communication frameworks, and distributed computing protocols that enable nodes to interact securely and efficiently. In a non-limiting example, a node protocol 150 in a blockchain network may define how nodes validate transactions, reach consensus, and propagate new blocks across the ledger. In another non-limiting example, a node protocol 150 in a distributed database system may specify how data is replicated, synchronized, and queried across multiple servers to ensure fault tolerance and high availability.

With continued reference to FIG. 1, as used in this disclosure, an "optimal node" is a computing node within a distributed system that has been selected based on pre-defined criteria to perform a specific task with maximum efficiency. The optimal node 152 may include, without limitation, nodes selected based on computational power, network latency, energy efficiency, storage capacity, or workload distribution to enhance overall system performance. In a non-limiting example, an optimal node 152 in a cloud computing environment may be chosen to process a machine learning task based on its available GPU resources and low processing queue. In another non-limiting example, an optimal node 152 in a blockchain network may be selected to validate transactions based on its high processing speed and low latency to ensure fast consensus.

With continued reference to FIG. 1, as used in this disclosure, an "edge system" is a decentralized computing framework that processes data closer to the source of generation rather than relying on a centralized cloud infrastructure. The edge system 154 may include, without limitation, edge servers, IoT devices, gateways, and mobile computing units that perform local data processing, reducing latency and bandwidth usage. In a non-limiting example, the edge system 154 may include wearable health monitors that analyze patient vitals locally and send only critical alerts to a central hospital server.

With continued reference to FIG. 1, wherein the node protocols 150 may include choosing the optimal node 152 as a function of geolocation data 156. As used in this disclosure, "geolocation data" is information that identifies the physical location of a device, individual, or object based on geographic coordinates, network signals, or sensor inputs. The geolocation data 156 may include, without limitation, GPS coordinates, IP address-based location tracking, Wi-Fi positioning, cellular tower triangulation, and sensor-based location data collected from mobile devices, vehicles, or IoT systems. In a non-limiting example, geolocation data 156 may be used in a healthcare application to find the nearest hospital or pharmacy based on a patient's real-time location. With continued reference to FIG. 1, the node protocols 150 may include choosing the optimal node 152 as a function of geolocation data 156. In a non-limiting example, a distributed computing system may utilize geolocation data 156 to determine which server or processing unit should handle a specific request based on proximity, network latency, and resource availability. For instance, in a healthcare SaaS platform, a user accessing a telemedicine service may be routed to an optimal node 152—a server located in the nearest data center—to ensure minimal latency and real-time video streaming with a healthcare provider. In another non-limiting example, an IoT-based emergency response system may use geolocation data 156 from connected devices, such as wearables or mobile phones, to identify the closest processing node capable of handling a distress signal. If a user experiences a medical emergency and activates an alert, the system may dynamically select an edge computing node located within the same geographic region to process and relay critical information to nearby emergency responders, ensuring a rapid and efficient response. Without limitation, by leveraging geolocation data 156, the system enhances performance, reduces processing delays, and optimizes resource allocation within the distributed network.

With continued reference to FIG. 1, wherein the at least a processor 102 may be configured to utilize a third application programming interface 158, wherein the third application programming interface 158 is configured to establish a cloud computing connection 160 to a remote data center 162, receive multimodal data 106 from the remote data center 162 as a function of the first query 116, and transmit processed data 164 to the chatbot 114 from the remote data center 162. As used in this disclosure, a "cloud computing connection" is a communication link established between a device, application, or network and a cloud-based infrastructure to enable data transmission, remote processing, or resource access. The cloud computing connection 160 may include, without limitation, secure API calls, virtual private network (VPN) tunnels, encrypted data channels, WebSockets, and direct cloud service integrations that facilitate interaction with cloud-hosted services, storage, and computational resources. In a non-limiting example, a healthcare SaaS platform may establish a cloud computing connection 160 between a patient portal and a remote electronic records 146 (EHR) system, allowing authorized users to securely retrieve and update medical records in real time. In another non-limiting example, an AI-powered analytics platform may use a cloud computing connection 160 to offload machine learning model training to high-performance GPUs in a cloud data center, optimizing computational efficiency while maintaining seamless data synchronization with edge devices.

With continued reference to FIG. 1, as used in this disclosure, a "remote data center" is a geographically distributed facility that houses computing infrastructure, including servers, storage systems, networking equipment, and security components, to provide cloud-based computing, data processing, and remote storage services. The remote data center 162 may include, without limitation, public cloud data centers, private enterprise data centers, colocation facilities, and edge data centers that support scalable, high-availability computing resources. In a non-limiting example, a healthcare SaaS platform may rely on a remote data center 162 to store and process electronic records 146 (EHRs) while ensuring compliance with security regulations such as HIPAA. In another non-limiting example, a content delivery network (CDN) may use multiple remote data centers 162 to cache and distribute web content, reducing latency and improving performance for users accessing a website from different geographic locations.

Still referring to FIG. 1, processor 102 is configured to generate, using an evaluation model 166, a score 168 associated with the at least a first output 136 using system feedback 170. In an embodiment, the evaluation model 166 may be trained using a chatbot training dataset 122, wherein the chatbot training dataset 122 comprises historical outputs 172 associated with historical subsequent query data 174. As used in this disclosure, an "evaluation model" is a computational framework, algorithm, or set of criteria designed to assess, analyze, or measure the quality, effectiveness, or performance of a system. The evaluation model 166 may process input data, such as user feedback, system metrics, or contextual factors, and generate results or scores that inform decision-making, optimization, and improvement efforts. For example, without limitation, the evaluation model 166 may assess the effectiveness of a user output, such as a tailored explanation, by analyzing user feedback, comprehension scores, and/or interaction data. The evaluation model 166 may include parameters such as clarity, relevance, user engagement, and outcome success. Continuing, based on this analysis, the evaluation model 166 may recommend adjustments to improve future outputs or update user profiles 108. The evaluation model 166 may leverage techniques such as machine learning, statistical analysis, or rule-based algorithms to ensure accurate and context-sensitive assessments.

With continued reference to FIG. 1, as used in this disclosure, "system feedback" is information generated by a system in response to user inputs, operational conditions, or environmental factors, which may be utilized to adjust, optimize, or enhance system performance, functionality, or user experience. System feedback 170 may include visual, auditory, or haptic signals, real-time data outputs, performance analytics, or automated adjustments made by the system to maintain efficiency, accuracy, or intended operational parameters. In an embodiment, system feedback 170 may include recalibration data 176 as discussed in more detail below.

With continued reference to FIG. 1, further may include identifying, using the evaluation model 166, recalibration data 176 comprising a variance 178 from target output 180, wherein the variance 178 is derived from the score 168 and retraining, the evaluation model 166, using the recalibration data 176. As used in this disclosure, "recalibration data" is data used to optimize the performance of a system. In an embodiment, the recalibration data 176 may be used to optimize an algorithm and/or a device to maintain accuracy and reliability over time. The recalibration data 176 may include, without limitation, sensor correction values, machine learning model 120 updates, hardware adjustment parameters, feedback-driven modifications that ensure continued precision in data processing and system functionality. In a non-limiting example, a medical imaging AI system may use recalibration data 176 to adjust its diagnostic algorithms based on newly labeled training datasets, improving its ability to detect abnormalities in X-ray scans. As used in this disclosure, "variance" is the difference between an observed output and an expected or ideal outcome within a system, model, or process. The variance 178 may include, without limitation, deviations in predicted versus actual results, statistical discrepancies in machine learning performance, and measurable inconsistencies in sensor data that indicate a need for recalibration or optimization. As used in this disclosure, "target output" is the desired or expected result produced by a system, algorithm, or model based on predefined criteria or training objectives. The target output 180 may include, without limitation, correct classifications in AI models, expected numerical values in predictive analytics, and optimal operational thresholds in automated systems.

With continued reference to FIG. 1, further may include identifying, using the evaluation model 166, recalibration data 176 comprising a variance 178 from target output 180, wherein the variance 178 is derived from the score 168 and retraining the evaluation model 166 using the recalibration data 176. In a non-limiting example, an AI-driven diagnostic system may analyze a set of X-ray images to detect fractures, with the target output 180 being a correct classification of each scan. If the evaluation model 166 produces inconsistent or incorrect diagnoses, the variance 178, measured as the discrepancy between the predicted diagnosis and the actual medical report, may be used as recalibration data 176 to refine and retrain the AI model, improving accuracy over time. In another non-limiting example, a speech recognition system in a voice-enabled chatbot 114 may have a target output 180 of accurately transcribing user commands. If the apparatus 100 misinterprets certain phrases due to background noise or accent variations, the variance 178 between the transcription and the actual spoken words may be collected as recalibration data 176 to enhance the chatbot's 114 speech recognition model, reducing errors in future interactions. Without limitation, by continuously identifying and addressing variance 178, the apparatus 100 may ensure improved accuracy, adaptability, and long-term reliability in its performance.

Still referring to FIG. 1, processor 102 adjusts, within the question data structure, at least the weight associated with the at least a first output. In an embodiment, the processor 102 may adjust, within the question data structure, at least the weight associated with the at least a first output 136 to refine the prioritization of generated responses based on system feedback. In an embodiment, the adjustment process may involve modifying the weight based on a score 168 generated by the evaluation model 166, wherein the score 168 reflects the relevance, accuracy, or effectiveness of the first output 136 in addressing the received question. In an embodiment, the processor 102 may increase the weight of an output that has received positive system feedback, indicating its usefulness in responding to similar queries, or decrease the weight if the output is determined to be less relevant or redundant within the dataset. In an embodiment, the weight adjustment may be performed iteratively, allowing the question data structure to dynamically update as new feedback is received or additional multimodal data 106 is incorporated. In an embodiment, without limitation, this process may involve analyzing historical query-response patterns, user interactions, or confidence levels assigned by an underlying machine learning model of the chatbot 114.

Still referring to FIG. 1, processor 102 selects, from the question data structure, a plurality of questions, wherein the plurality of questions comprises a first question having a highest weight within the question data structure and a successive question having a second highest weight within the question data structure. As used in this disclosure, a "question" is an inquiry generated by the chatbot in response to a user input. In an embodiment, the question may be configured to refine, clarify, or expand upon the information sought by the user. The question may be assigned a weight based on factors such as relevance, contextual importance, system feedback, or user engagement data. As used in this disclosure, a "first question" is a chatbot-generated inquiry that has the highest assigned weight within the question data structure. In an embodiment, the weight may be determined based on the question's relevance to the user query, system feedback, or other prioritization criteria. The first question may be selected for display as the most contextually significant follow-up to the user query. As used in this disclosure, a "successive question" is a chatbot-generated inquiry that has the second highest assigned weight within the question data structure. In an embodiment, the weight may be determined based on relevance to the user query, system feedback, or other prioritization criteria. The successive question may follow the first question temporally and is selected to further refine or supplement the response provided to the user. For example, without limitation, after receiving an initial query, the chatbot may generate multiple follow-up questions, each assigned a weight based on relevance, importance, or system feedback. Processor 102 may then select a subset of these chatbot-generated questions, prioritizing those with the highest weights. The first selected question is the most relevant follow-up, while the next selected question is the second most relevant. These questions ay be displayed sequentially on a downstream device 182 to refine user engagement, improve data collection, and enhance the chatbot's response accuracy. For example, without limitation, if the initial user query is "What are the symptoms of diabetes?", the chatbot may generate multiple follow-up questions and assign weights based on relevance. Processor 102 then selects the highest-weighted questions, such as: First follow-up question (highest weight): "Are you experiencing frequent thirst, excessive urination, or unexplained weight loss?" Second follow-up question (second highest weight): "Do you have a family history of diabetes or related metabolic conditions?" In another non-limiting example, the initial query may include "What causes high blood pressure?" The chatbot may generate several potential follow-up questions, selecting the most relevant: First follow-up question (highest weight): "Do you have a history of stress, high sodium intake, or lack of physical activity?" Second follow-up question (second highest weight): "Are you currently taking any medications or have underlying conditions such as kidney disease or diabetes?"

Still referring to FIG. 1, processor 102 is configured to display, using a downstream device 182, the first question followed temporally by the second question. In an embodiment, the first question and the second question may be displayed using a visualization 184. As used in this disclosure, "downstream device" is a device that accesses and interacts with apparatus 100. For instance, and without limitation, downstream device 182 may include a remote device and/or apparatus 100. In a non-limiting embodiment, downstream device 182 may be consistent with a computing device as described in the entirety of this disclosure. Without limitation, the downstream device 182 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the visualization 184 may include displaying the visualization 184 at display device using a visual interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. In an embodiment, the graphical user interface and an event handler may operate together to enable seamless interaction between the user and the apparatus 100. The GUI serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying user-specific output, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in query be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device 182 may include a data structure. As used in this disclosure, "data structure" is a way of organizing data represented in a specialized format on a computer configured such that the information can be effectively presented in a graphical user interface. In some cases, the data structure includes any input data. In some cases, the data structure contains data and/or rules used to visualize the graphical elements within a graphical user interface. In some cases, the data structure may include any data described in this disclosure. In some cases, the data structure may be configured to modify the graphical user interface, wherein data within the data structure may be represented visually by the graphical user interface. In some cases, the data structure may be continuously modified and/or updated by processor 102, wherein elements within graphical user interface may be modified as a result. In some cases, processor 102 may be configured to transmit display device and or the downstream device 182 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure, such as a dictionary or tree, that maps each topic to its associated resources or actions. The data structure may retrieve the relevant information such as, text explanations, videos, or interactive exercises, and passes it back to the event handler, which may then trigger the appropriate updates to the GUI, such as displaying the selected topic's content. In another embodiment, the data structure may also maintain the state of the system, tracking user progress, preferences, and session history. For instance, without limitation, a hash table may store user specific configurations, such as preferred learning styles or recent activity, which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface (GUI) that allows users to perform actions, provide input, or engage with the apparatus 100. Interactive elements may be designed to facilitate two-way communication between the user and the system, enabling the user to influence the behavior of the apparatus 100 or obtain feedback in response to their actions. Examples of interactive elements may include buttons, dropdown menus, sliders, checkboxes, input fields, and hyperlinks. For instance, without limitation, a button labeled "Submit" may allow a user to send their input for processing, while a slider may let the user adjust settings, such as the difficulty level of an educational activity. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data, such as a user's profile or a query of the plurality of queries 118. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles 108 or historical activity. Communication technologies may also help maintain the responsiveness of interactive elements. AJAX (Asynchronous JavaScript and XML) may allow the front end to update portions of a web page without requiring a full page reload, enhancing responsiveness. WebSockets may provide real-time interaction capabilities, such as live chats or collaborative tools, by enabling persistent communication between the client and the server. For example, without limitation, a button labeled "Ask the Chatbot" in a patient portal may be rendered using HTML and CSS, while JavaScript adds an event listener to detect when the button is clicked. Once clicked, the event listener may send a request to a chatbot API. The server may process this request, analyze the patient's query using natural language processing (NLP), and retrieve relevant medical information from multimodal data 106 sources such as health records, symptom databases, or medical guidelines. The chatbot's 114 response may then be dynamically displayed within the portal without requiring the user to reload the page. This combination of technologies may ensure that patient interactions with the chatbot 114 are seamless, responsive, and capable of handling complex health-related inquiries effectively. Without limitation, the apparatus 100 may include one or more APIs.

With continued reference to FIG. 1, wherein the processor 102 may be further configured to process, using an image processor 186, the multimodal data 106 by receiving image data 188, identifying one or more features 190 within the image data 188, determining a correlation 192 between the one or more features 190 and additional input 194, generating a processed image 196 output based on the correlation 192, and displaying, using the downstream device 182, the at least a first output 136 comprising the processed image 196 output. As used in this disclosure, an "image processor" is a hardware or software-based system configured to analyze image data 188 for various applications. The image processor 186 may include, without limitation, specialized integrated circuits (ICs), graphical processing units (GPUs), field-programmable gate arrays (FPGAs), software-based image processing algorithms executed on general-purpose processors, and the like. In a non-limiting example, the image processor 186 may analyze X-ray or MRI scans to detect anomalies such as fractures or tumors using artificial intelligence models. In another non-limiting example, the image processor 186 may apply real-time noise reduction, color correction, edge enhancement to improve photo quality before storing the image.

With continued reference to FIG. 1, the image processor 186 may include, but is not limited to, image enhancement and restoration, segmentation of features based on an area of interest, registration and fusion of multimodality images, classification of image features through structure characterization, quantitative measurement of image features, any combination thereof, and the like. Image processor 186 may include any image processing technique used across various fields including, but not limited to, healthcare, remote sensing, surveillance, entertainment, robotics, and the like. In an embodiment, image processor 186 may include an edge detection technique. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processor 186, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

With continued reference to FIG. 1, in a non-limiting example, identifying one or more features from image data 188 may include isolating one or more areas of interests using one or more edge detection techniques. An area of interest may include a specific area within a digital image that contains information relevant to further processing, such as one or more image features. In a non-limiting example, image data located outside an area of interest may include irrelevant or extraneous information. Such portion of image data containing irrelevant or extraneous information may be disregarded by image processor 186, thereby allowing resources to be concentrated at a targeted area of interest. In some cases, the area of interest may vary in size, shape, and/or location within image data. In a non-limiting example the area of interest may be presented as a circle around the nucleus of a cell. In some cases, the area of interest may specify one or more coordinates, distances, and the like, such as center and radius of a circle around the nucleus of a cell in an image. Image processor 186 may then be configured to isolate the area of interest from image data based on the particular feature. In a non-limiting example, image processor 186 may crop an image according to a bounding box around an area of interest.

With continued reference to FIG. 1, processor 102 may transform a digital image or drawing into processed multimodal data using a plurality of image processors. As used in this disclosure, a "plurality of image processors" is one or more distinct image processing technique designed to perform specific processing tasks and or operations to the digital image. For example, and without limitation, plurality of image processors may be configured to compile plurality of digital images to create an integrated image. In an embodiment, plurality of image processors may include a plurality of software algorithms that can analyze, manipulate, or otherwise enhance an image, such as, without limitation, a plurality of image processing techniques as described below. Plurality of image processors may include, without limitation, modules that perform modifications such as random rotation, color jitter, Gaussian blur, perspective transform, shear transform, shadow casting, reflected light, ink color swap, moire, noise texturization, Gaussian noise, salt and pepper noise, folding and creasing, crumpled paper effect, and the like, and described in detail above. In a non-limiting example, plurality of image processors may include any combination of plurality of image processors. In some cases, plurality of image processors may be implemented with one or more image processing libraries such as, without limitation, OpenCV, PIL/Pillow, ImageMagick, and the like. Plurality of image processors may include, be included in, or be communicatively connected to processor 102, and/or memory 104.

With continued reference to FIG. 1, in an embodiment, plurality of image processors may be configured to compress and/or encode images to reduce the file size and storage requirements while maintaining the essential visual information needed for further processing steps as described below. In an embodiment, compression and/or encoding of plurality of images may facilitate faster transmission of images. In some cases, image processors may be configured to perform a lossless compression on images, wherein the lossless compression may maintain the original image quality of images. In a nonlimiting example, plurality of image processors may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, plurality of image processors may be configured to perform a lossy compression on plurality of images, wherein the lossy compression may sacrifice some image quality of images to achieve higher compression ratios. In a non-limiting example, plurality of image processors may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

With continued reference to FIG. 1, in an embodiment, processing images may include determining a degree of quality of depiction of a region of interest of an image or a plurality of images. In an embodiment, plurality of image processors may determine a degree of blurriness of images. In a non-limiting example, plurality of image processors may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics such as texture descriptors in order to compute a focus level. In other cases, blur detection may be performed by using discrete cosine transform (DCT) coefficients in order to compute a focus level of images from its frequency content. Additionally, or alternatively, plurality of image processors may be configured to rank images according to degree of quality of depiction of a region of interest and select a highest-ranking image from a plurality of digital images.

With continued reference to FIG. 1, processing images may include enhancing at least a region of interest via a plurality of image processing techniques to improve the quality (or degree of quality of depiction) of an image for better processing and analysis as described further in this disclosure. In an embodiment, plurality of image processors may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by plurality of image processors, by averaging or filtering out pixel values in neighborhood of each pixel of an image to reduce random variations.

With continued reference to FIG. 1, in another embodiment, plurality of image processors may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Plurality of image processors may be configured to adjust the brightness and darkness levels within an image to make a feature more distinguishable (i.e., increase degree of quality of depiction). Additionally, or alternatively, plurality of image processors may be configured to perform a brightness normalization operation to correct variations in lighting conditions (i.e., uneven brightness levels). In some cases, an image may include a consistent brightness level across a region after brightness normalization operation performed by plurality of image processors. In a non-limiting example, plurality of image processors may perform a global or local mean normalization, where the average intensity value of an entire image or region of an image may be calculated and used to adjust the brightness levels.

With continued reference to FIG. 1, in other embodiments, plurality of image processors may be configured to perform a color space conversion operation to increase degree of quality of depiction. In a non-limiting example, in case of a color image (i.e., RGB image), plurality of image processors may be configured to convert RGB image to grayscale or HSV color space. Such conversion may emphasize the differences in intensity values between a region or feature of interest and the background. Plurality of image processors may further be configured to perform an image sharpening operation such as, without limitation, unsharp masking, Laplacian sharpening, high-pass filtering, and/or the like. Plurality of image processors may use image sharpening operation to enhance the edges and fine details related to a region or feature of interest within an image by emphasizing high-frequency components within an image.

With continued reference to FIG. 1, processing images may include isolating a region or feature of interest from the rest of an image as a function of plurality of image processing techniques. Images may include highest-ranking image selected by plurality of image processors as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by plurality of image processors to enhance the edges of objects, remove noise, or fill gaps in a region or feature of interest before further processing.

With continued reference to FIG. 1, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by plurality of image processors, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

Referring to FIG. 1, in a non-limiting example, identifying one or more features from image data may include isolating one or more areas of interests using one or more edge detection techniques. An area of interest may include a specific area within a digital image that contains information relevant to further processing, such as one or more image features. In a non-limiting example, image data located outside an area of interest may include irrelevant or extraneous information. Such portion of image data containing irrelevant or extraneous information may be disregarded by plurality of image processors, thereby allowing resources to be concentrated at a targeted area of interest. In some cases, the area of interest may vary in size, shape, and/or location within image data. In a non-limiting example the area of interest may be the ECG trace. In some cases, the area of interest may specify one or more coordinates, distances, and the like. Plurality of image processors may then be configured to isolate the area of interest from image data based on the particular feature. In a non-limiting example, plurality of image processors may crop an image according to a bounding box around an area of interest.

With continued reference to FIG. 1, plurality of image processors may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, plurality of image processors may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Plurality of image processors may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by plurality of image processors as feature of interest, while other components may be discarded. Plurality of image processors may be further configured to extract feature of interest from an image for further processing.

With continued reference to FIG. 1, processor 102 may transform uploaded digital images or drawings into processed multimodal data using plurality of image processors configured to receive digital image from the digital image repository and modify the digital image. One or more digital image may be transmitted from processor 102 to plurality of image processors via any suitable electronic communication protocol, including without limitation packet-based protocols such as transfer control protocol internet protocol (TCP-IP), file transfer protocol (FTP) or the like. Receiving images may include retrieval of digital image from a data store containing images as described below; for instance, and without limitation, images may be retrieved using a query that specifies a timestamp that images may be required to match.

With continued reference to FIG. 1, wherein the at least a first output 136 of the plurality of outputs 138 may include at least a resource 198. As used in this disclosure, a "resource" is information related to user support. The resource 198 may include, without limitation, healthcare professionals, medical databases, clinical guidelines, symptom checkers, pharmaceutical references, telemedicine platforms, mental health support services, and the like. In a non-limiting example, the resource 198 may include an online database of drug interactions that helps physicians and pharmacists ensure safe medication prescriptions. In another non-limiting example, a resource 198 may be a telehealth platform that connects patients with licensed doctors for virtual consultations and real-time medical advice.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
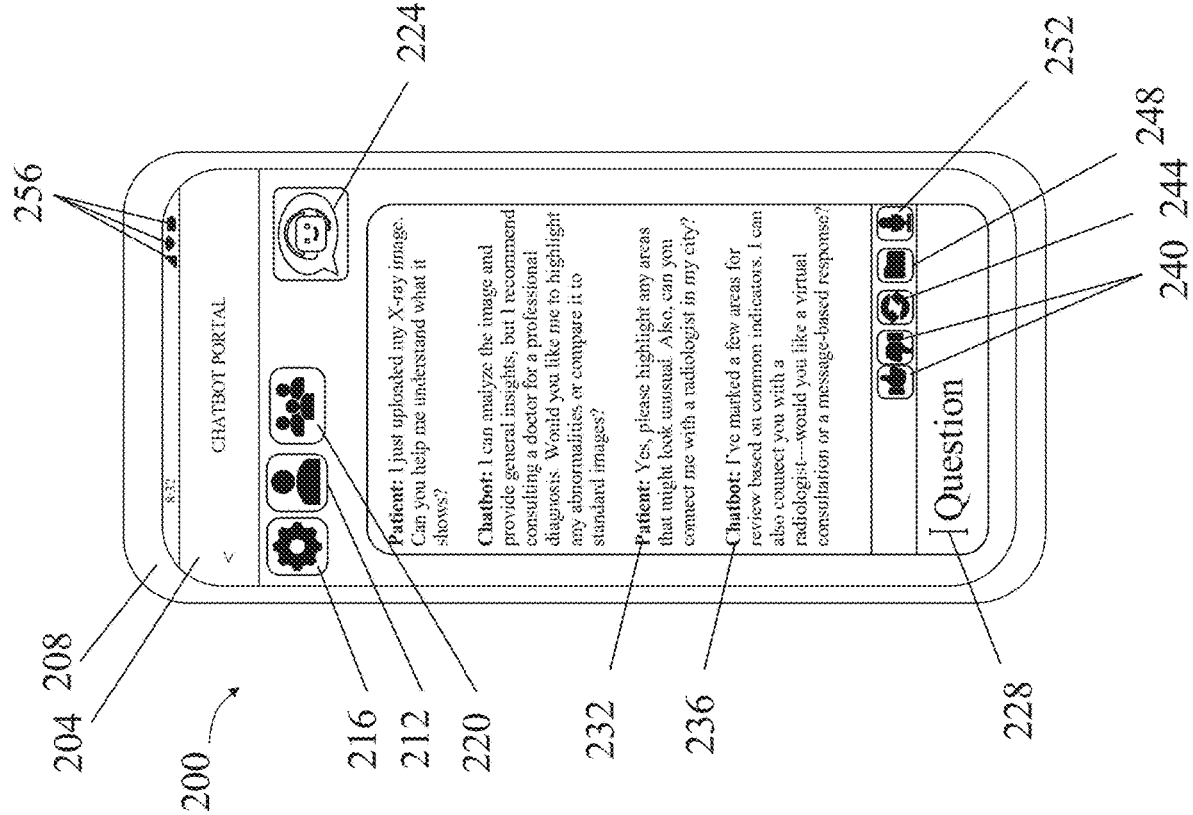
FIG. 2 is an exemplary illustration of a graphical user interface.

Referring now to FIG. 2, an exemplary illustration 200 of a graphical user interface. In an embodiment, the graphical user interface (GUI) 204 may be displayed on a downstream device 208. In an embodiment, the downstream device 208 may include a smartphone, tablet, or computer. In an embodiment, the GUI 204 may include a user profile icon 212. In an embodiment, the user profile icon 212 may serve as an interactive element that allows users to access and manage their personal account settings. In an embodiment, the user profile icon 212 may provide a direct link to the user's profile, where they may update personal information, review activity history, and configure preferences related to their interactions within the system. In an embodiment, the user profile icon 212 may enable users to modify details such as their name, contact information, medical history, or security settings. In an embodiment, the user profile icon 212 may serve as a gateway to account-related features, including login credentials, privacy controls, and system permissions. In an embodiment, the user profile icon 212 may support multi-user functionality, allowing different users to switch profiles or customize their experience within the same system. In an embodiment, the user profile icon 212 may incorporate a visual indicator, such as a profile picture placeholder, initials, or a silhouette, providing a recognizable representation of the user. In an embodiment, the user profile icon 212 may include a notification badge, alerting users to profile-related updates, messages, or required actions. In an embodiment, the user profile icon 212 may facilitate seamless user management and personalization within the GUI 204. In an embodiment, the GUI 204 may include a gear icon 216. The GUI 204 may incorporate a gear icon 216, which may provide access to system settings, allowing users to customize preferences, adjust configurations, or manage administrative controls. In an embodiment, the GUI 204 may include a community icon 220. The community icon 220 may be included, enabling users to engage with forums, support groups, or knowledge-sharing platforms within the system. In an embodiment, the GUI 204 may include a chatbot icon 224. In an embodiment, the chatbot icon 224 may serve as a gateway to an AI-driven assistant capable of responding to user inquiries, offering guidance, and facilitating connections with healthcare professionals. In an embodiment, the GUI 204 may include an input field 228. The input field 228 may allow users to enter queries, provide responses, or interact with system features. In an embodiment, the GUI 204 may include a user input text 232. The user input text 232 may display the text entered by the user, ensuring clear communication within the interface. In an embodiment, the GUI 204 may include a chatbot output 236. The chatbot output 236 may present the chatbot's responses, insights, or suggested actions based on the user's input. In an embodiment, the GUI 204 may include a feedback icon 240. The feedback icon 240 may be available, permitting users to provide system feedback, report issues, or rate chatbot interactions to enhance system accuracy and user experience. In an embodiment, the GUI 204 may include a refresh button 244. The refresh button 244 may allow users to reload content, update displayed data, or reset interface elements as needed. In an embodiment, the GUI 204 may include an open folder button 248. For file management and access, the open folder button 248 may enable users to retrieve stored documents, medical records, or previously uploaded files. In an embodiment, the GUI 204 may include a voice input button 252. The voice input button 252 may allow users to engage with the system through voice commands or dictation, facilitating accessibility and ease of use. In an embodiment, the GUI 204 may include a plurality of interactive icons 256. In an embodiment, the plurality of interactive icons 256 may be provided to display key system information, such as Wi-Fi connectivity, battery life, and signal strength, ensuring that users remain aware of their device's status while interacting with the system.

Figure 3:
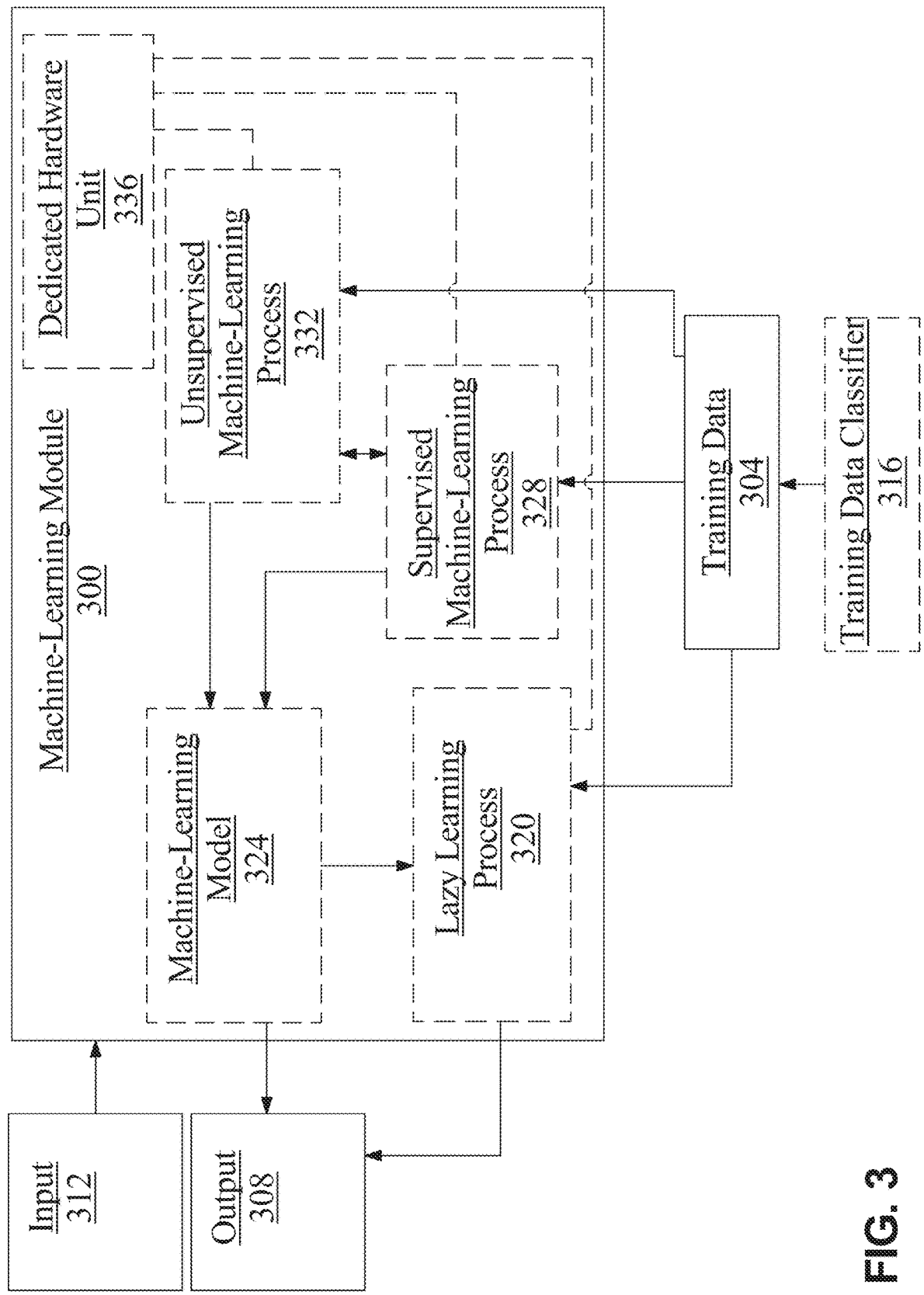
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs such as passive data and active data, and outputs such as plurality of outputs.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories of patients, categories of patients within certain geographical locations, and the like.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute 130, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute 130 along an equivalent scale of values. Each vector may be "normalized," or divided by a "length" attribute, such as a length attribute l as derived using a Pythagorean norm:

$$l = \sqrt{\sum_{i=0}^{n} a_i^2}$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include such as passive data and active data as described above as inputs, plurality of outputs as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus 100, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
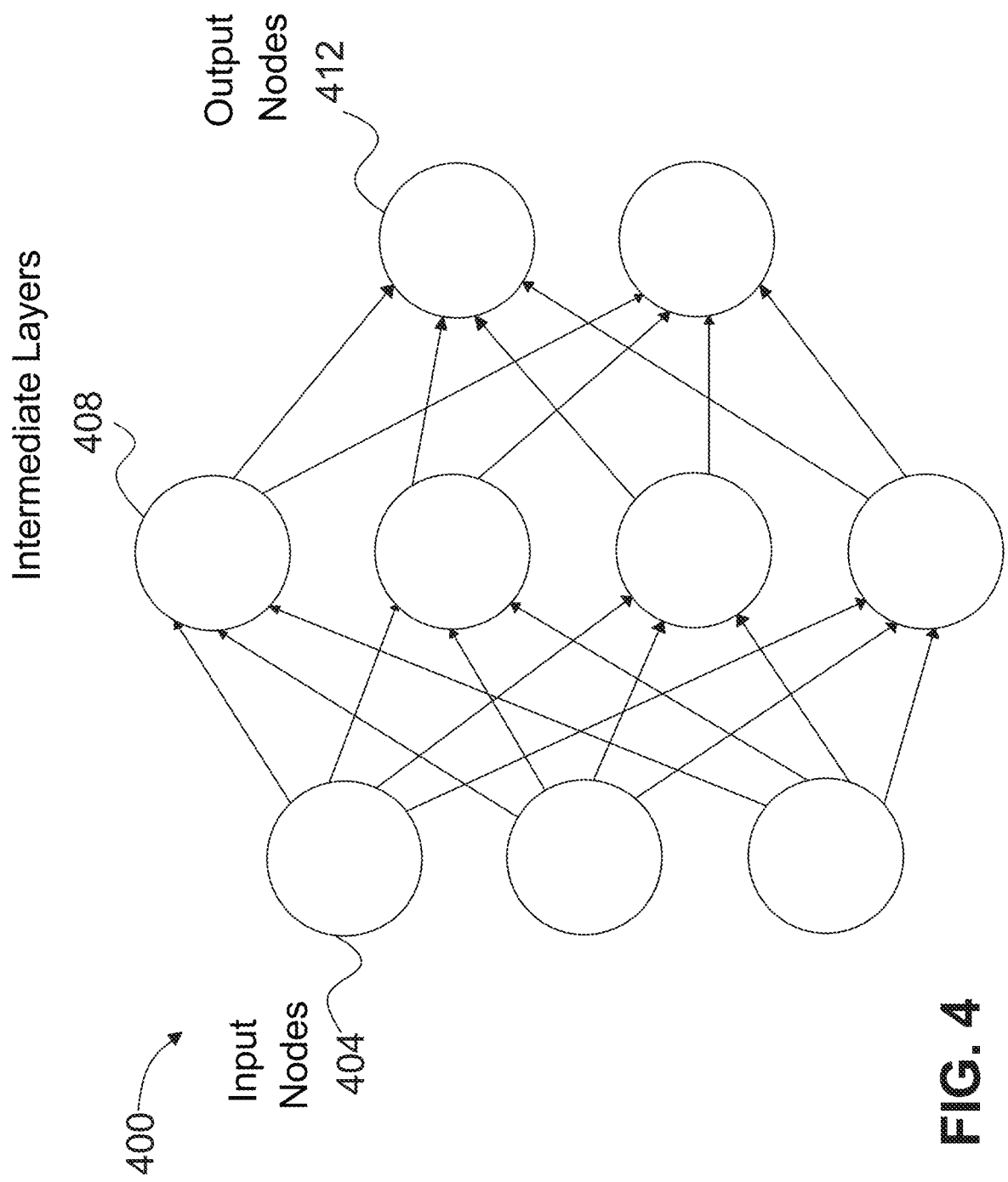
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
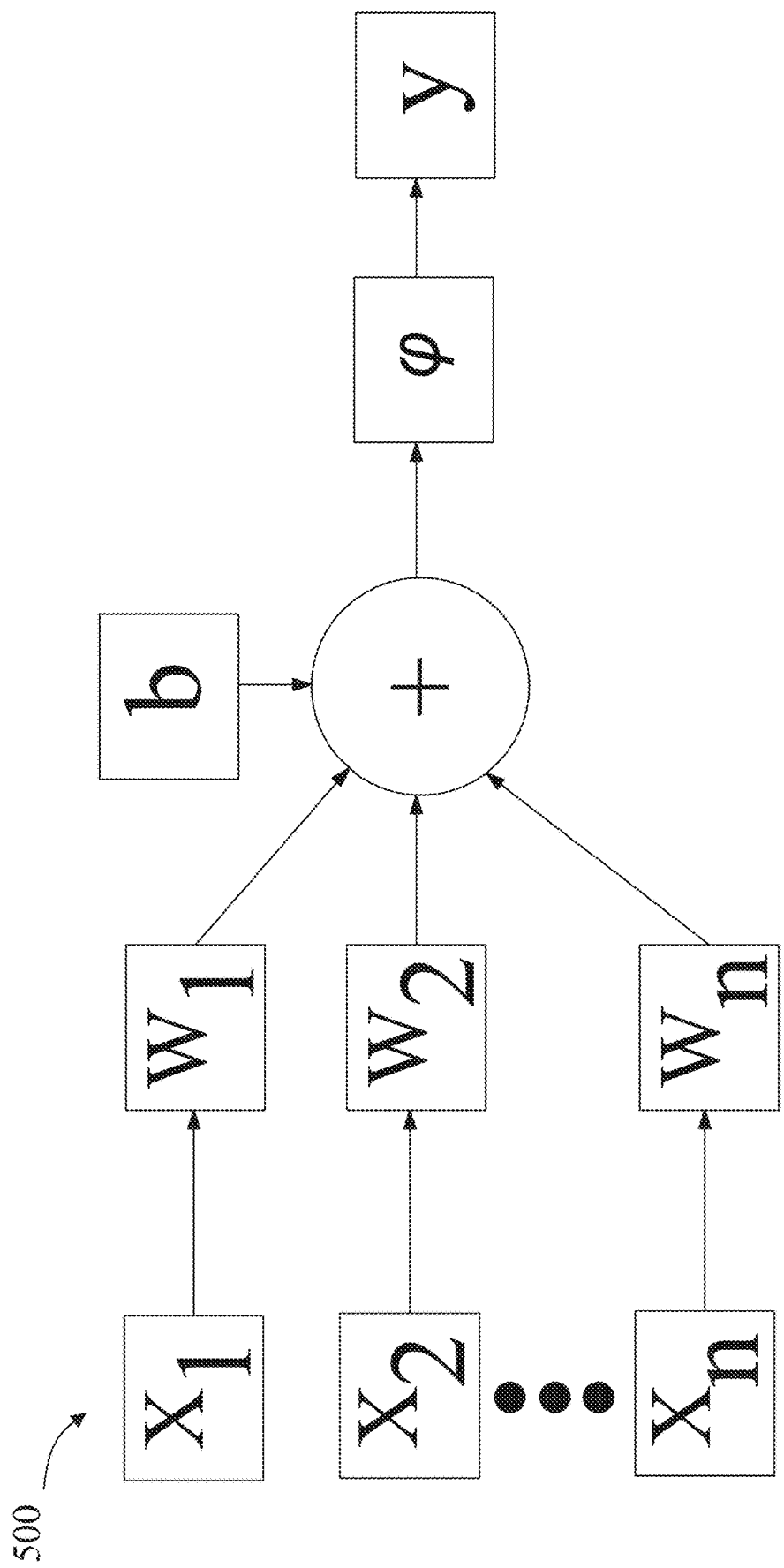
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
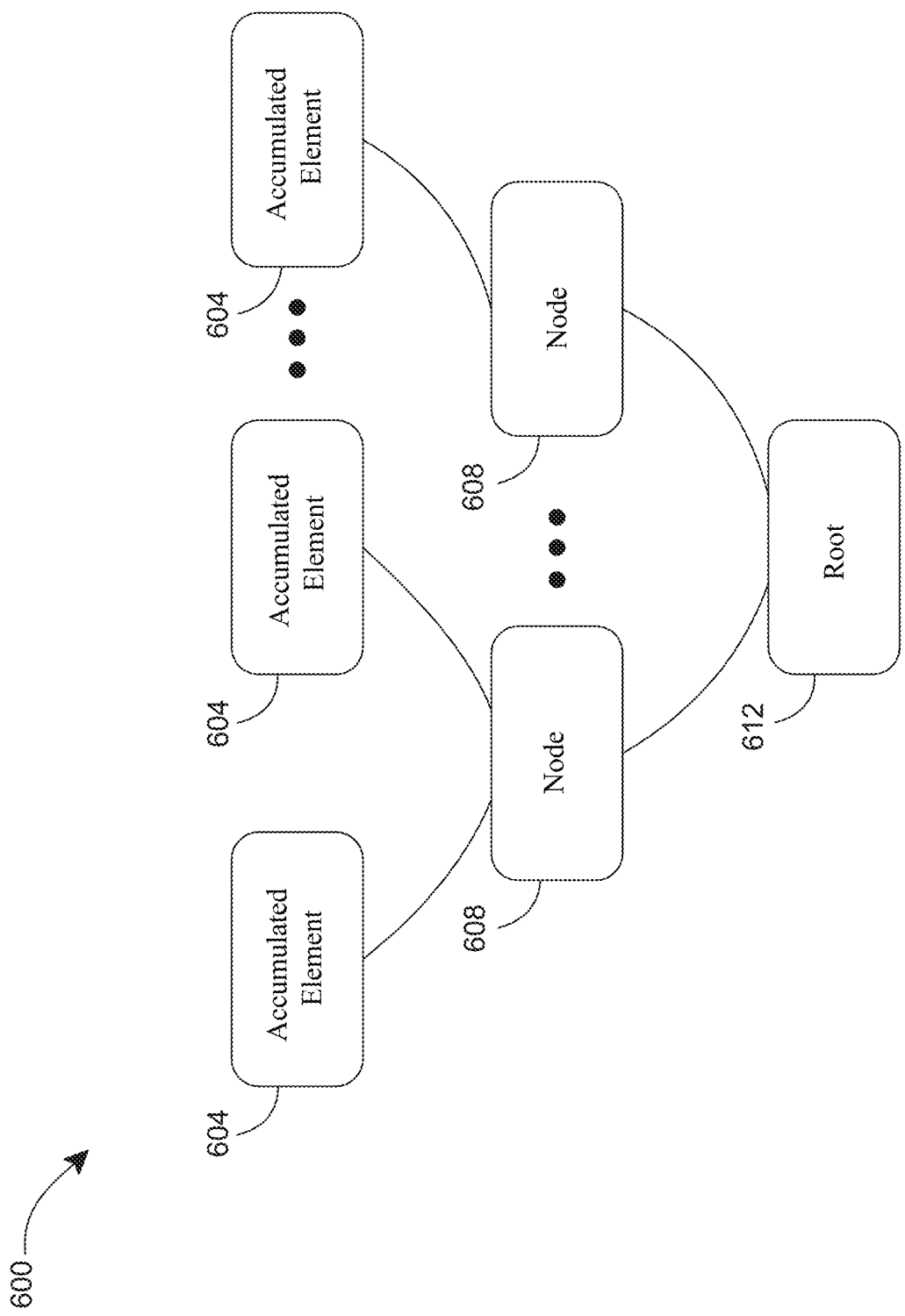
FIG. 6 is a diagram of an exemplary embodiment of a cryptographic accumulator.

Referring now to FIG. 6, an exemplary embodiment of a cryptographic accumulator 600 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 600 has a plurality of accumulated elements 604, each accumulated element 604 generated from a lot of the plurality of data lots. Accumulated elements 604 are create using an encryption process, defined for this purpose as a process that renders the lots of data unintelligible from the accumulated elements 604; this may be a one-way process such as a cryptographic hashing process and/or a reversible process such as encryption. Cryptographic accumulator 600 further includes structures and/or processes for conversion of accumulated elements 604 to root 612 element. For instance, and as illustrated for exemplary purposes in FIG. 6 cryptographic accumulator 600 may be implemented as a Merkle tree and/or hash tree, in which each accumulated element 604 created by cryptographically hashing a lot of data. Two or more accumulated elements 604 may be hashed together in a further cryptographic hashing process to produce a node 608 element; a plurality of node 608 elements may be hashed together to form parent nodes 608, and ultimately a set of nodes 608 may be combined and cryptographically hashed to form root 612. Contents of root 612 may thus be determined by contents of nodes 608 used to generate root 612, and consequently by contents of accumulated elements 604, which are determined by contents of lots used to generate accumulated elements 604. As a result of collision resistance and avalanche effects of hashing algorithms, any change in any lot, accumulated element 604, and/or node 608 is virtually certain to cause a change in root 612; thus, it may be computationally infeasible to modify any element of Merkle and/or hash tree without the modification being detectable as generating a different root 612. In an embodiment, any accumulated element 604 and/or all intervening nodes 608 between accumulated element 604 and root 612 may be made available without revealing anything about a lot of data used to generate accumulated element 604; lot of data may be kept secret and/or demonstrated with a secure proof as described below, preventing any unauthorized party from acquiring data in lot.

Alternatively or additionally, and still referring to FIG. 6, cryptographic accumulator 600 may include a "vector commitment" which may act as an accumulator in which an order of elements in set is preserved in its root 612 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 600 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 7:
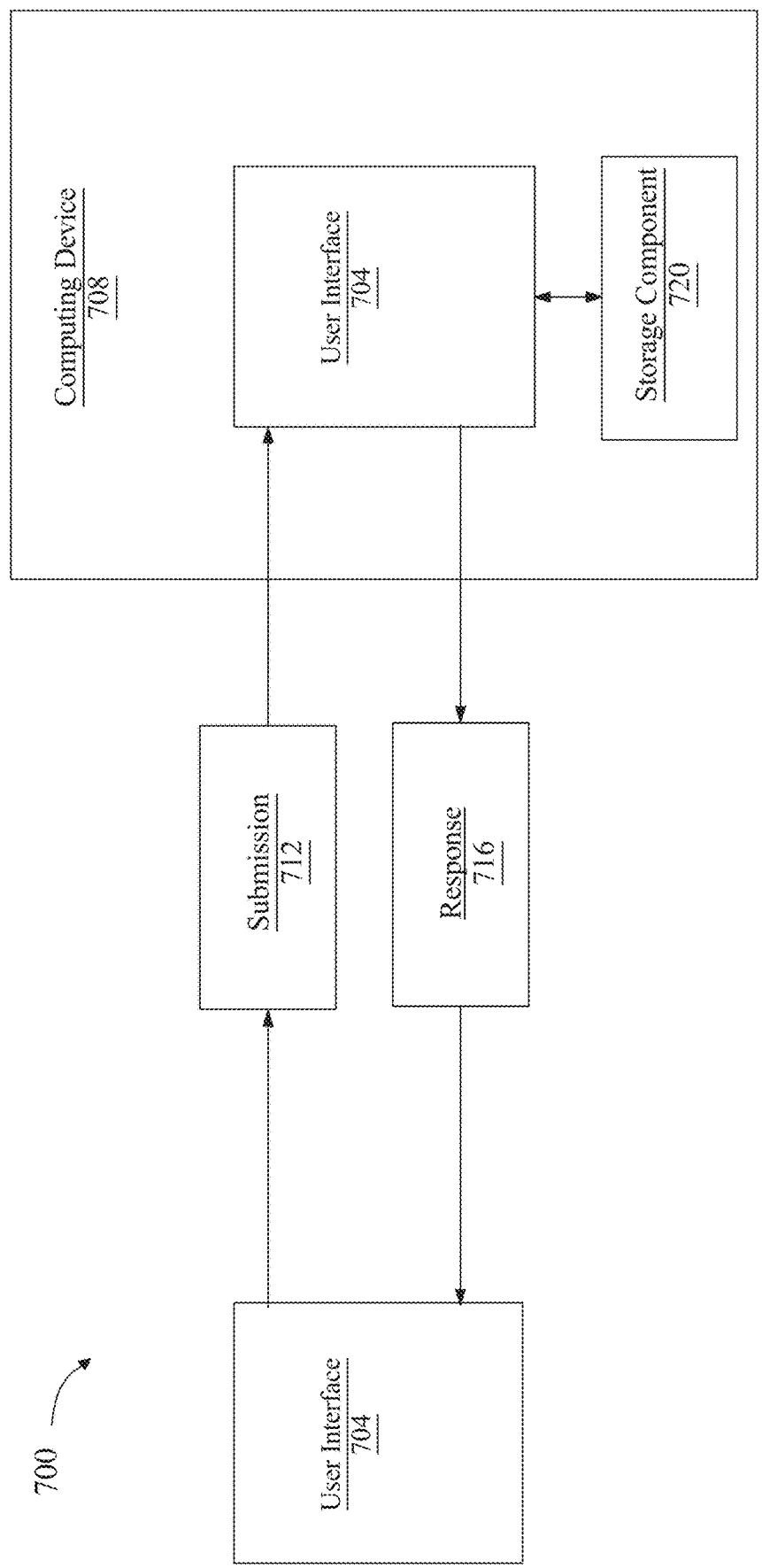
FIG. 7 is a diagram of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor 720. In some embodiments, processor 720 processes submission 712 using one or more of keyword recognition, pattern matching, and natural language processing. In some embodiments, processor employs real-time learning with evolutionary algorithms. In some cases, processor 720 may retrieve a pre-prepared response from at least a storage component 724, based upon submission 712. Alternatively or additionally, in some embodiments, processor 720 communicates a response 616 without first receiving a submission 712, thereby initiating conversation. In some cases, processor 720 communicates an inquiry to user interface 704; and the processor is configured to process an answer to the inquiry in a following submission 712 from the user interface 704. In some cases, an answer to an inquiry present within submission 712 from a user device may be used by computing device as an input to another function.

Figure 8:
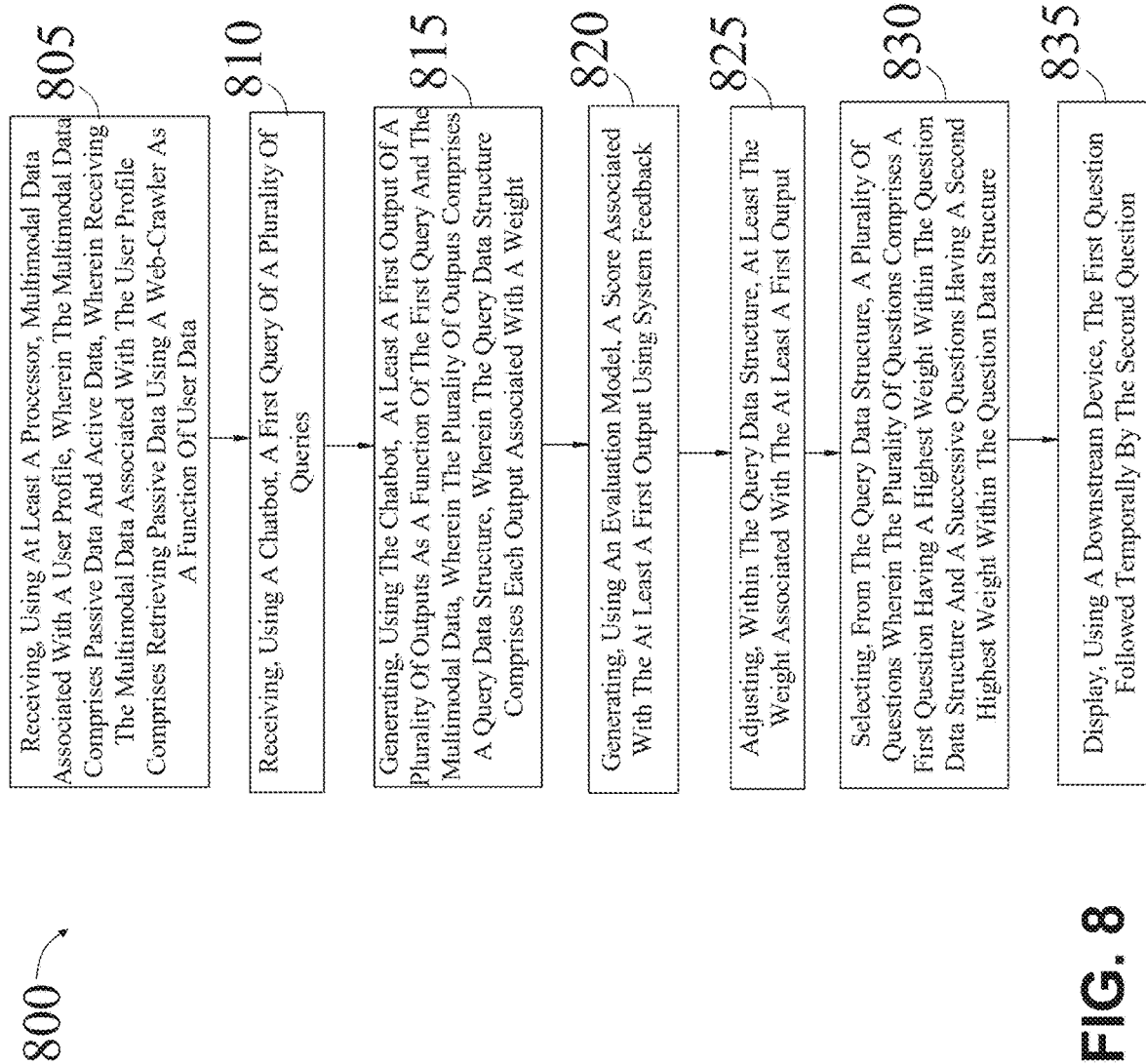
FIG. 8 is a block diagram of an exemplary method for generating resource output as a function of a query and multimodal data.

Referring now to FIG. 8, a flow diagram of an exemplary method 800 for generating resource output as a function of a query and multimodal data is illustrated. At step 805, method 800 includes receiving, using at least a processor, multimodal data associated with a user profile, wherein the multimodal data comprises passive data and active data wherein receiving the multimodal data associated with the user profile comprises retrieving passive data using a webcrawler as a function of user data. This may be implemented as described and with reference to FIGS. 1-7.

Still referring to FIG. 8, at step 810, method 800 includes receiving, using a chatbot, a first query of a plurality of queries. In an embodiment, the chatbot may include a machine learning model, wherein the machine learning model is iteratively trained on the chatbot training dataset. In an embodiment, the chatbot further may include a large language model, wherein the large language model is configured to receive the multimodal data, processes the multimodal data using a trained neural network, wherein processing comprises extracting, using embedding techniques, at least an attribute from the multimodal data, identifying, using the at least an attribute, at least a pattern from the multimodal data, and generating, using the at least a pattern, return data, generate, using the return data, the at least a first output of the plurality of outputs. This may be implemented as described and with reference to FIGS. 1-7.

Still referring to FIG. 8, at step 815, method 800 includes generating, using the chatbot, at least a first output of a plurality of outputs as a function of the first query and the multimodal data, wherein the plurality of outputs comprises a query data structure, wherein the query data structure comprises each output associated with a weight. In an embodiment, the at least a processor may be configured to utilize a first application programming interface, wherein the first application programming interface is configured to authenticate user credentials associated with the user profile, access, using the authenticated user credentials, a data repository, retrieve the multimodal data comprising a plurality of electronic records from the data repository, and transmit the plurality of health records to the chatbot, wherein the chatbot is configured to generate the at least a first output. In an embodiment, the at least a processor may be configured to utilize a second application programming interface, wherein the second application programming interface is configured to identify, using a node protocol, an optimal node of an edge system, establish a connect to the optimal node of the edge system, process, using the optimal node, the multimodal data, generate, using the optimal node, the plurality of outputs, and transmit the plurality of outputs to the downstream device. In an embodiment, the node protocols may include choosing the optimal node as a function of geolocation data. In an embodiment, the at least a processor may be configured to utilize a third application programming interface, wherein the third application programming interface is configured to establish a cloud computing connection to a remote data center, receive multimodal data from the remote data center as a function of the first query, and transmit processed data to the chatbot from the remote data center. This may be implemented as described and with reference to FIGS. 1-7.

Still referring to FIG. 8, at step 820, method 800 includes generating, using an evaluation model, a score associated with the at least a first output using system feedback, wherein the evaluation model is trained using a chatbot training dataset, wherein the chatbot training dataset comprises historical outputs associated with historical subsequent query data. In an embodiment, this may include identifying, using the evaluation model, recalibration data comprising a variance from target output, wherein the variance is derived from the score and retraining, the evaluation model, using the recalibration data. This may be implemented as described and with reference to FIGS. 1-7.

Still referring to FIG. 8, at step 825, method 800 includes displaying, using a downstream device, the at least a first output in a visualization. In an embodiment, the processor may be further configured to process, using an image processor, the multimodal data by receiving image data, identifying one or more features within the image data, determining a correlation between the one or more features and additional input, generating a processed image output based on the correlation, and displaying, using the downstream device, the at least a first output comprising the processed image output. In an embodiment, the at least a first output of the plurality of outputs may include at least a resource. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
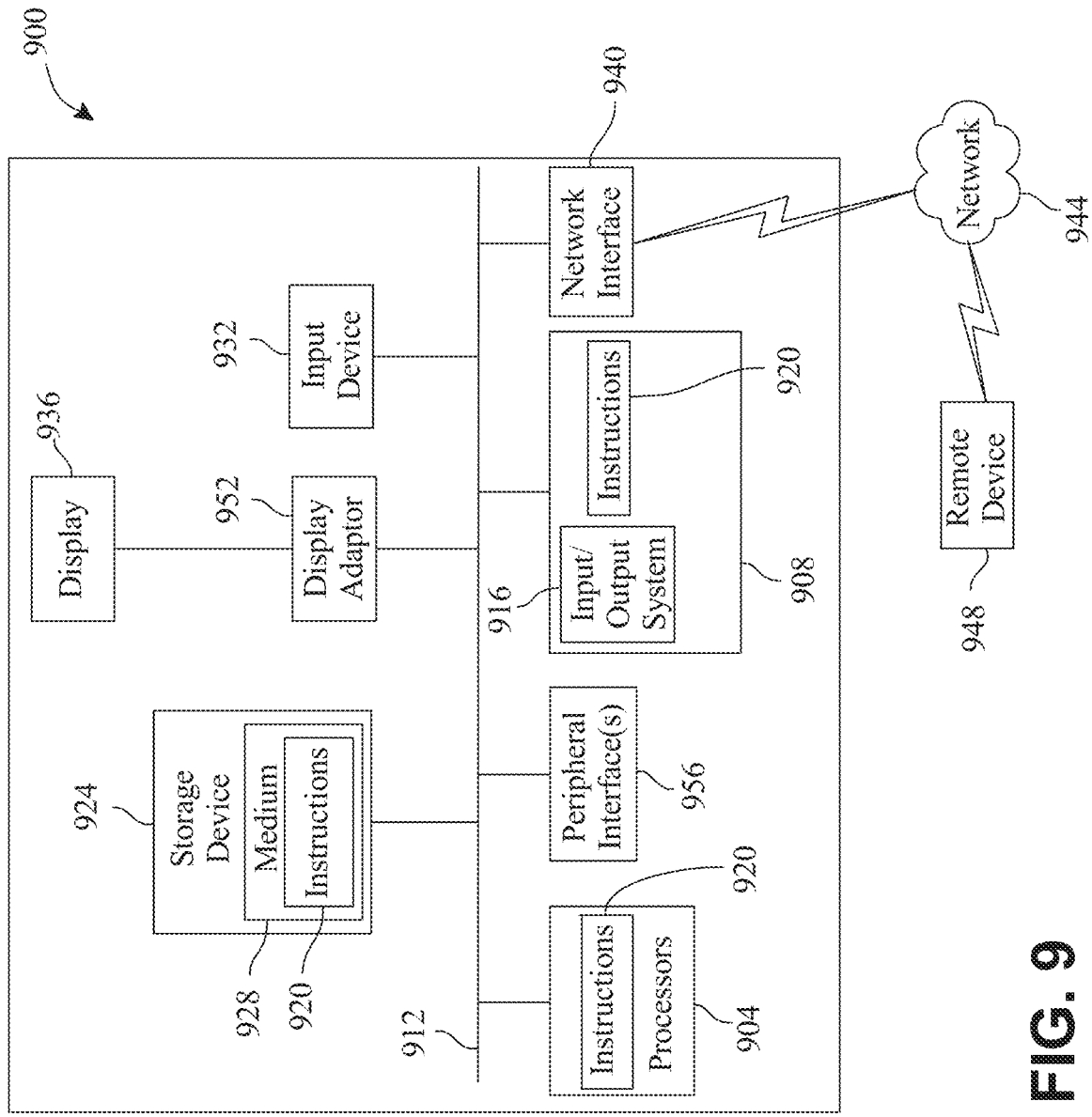
FIG. 9 is a block diagram of a computing system that can be used to implement any one or more of the methodologies disclosed herein and any one or more portions thereof.

FIG. 9 shows a diagrammatic representation of one embodiment of computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating resource output as a function of a plurality of queries and multimodal data, wherein the apparatus comprises:
   at least a computing device, wherein the computing device comprises:
     a memory; and
     at least a processor communicatively connected to the memory, wherein the memory contains instructions configuring
   the at least a processor to:
     receive, using the at least a processor, the multimodal data associated with a user profile, wherein the multimodal data comprises passive data and active data, wherein receiving the multimodal data associated with the user profile comprises retrieving passive data using a web-crawler as a function of user data;

receive, using a chatbot, a first query of the plurality of queries;

generate, using the chatbot, at least a first output of a plurality of outputs as a function of the first query and the multimodal data, wherein the plurality of outputs comprises a question data structure, wherein the question data structure comprises each output associated with a weight which comprises a relevance of the at least a first output;

generate, using an evaluation model, a score associated with the at least a first output using system feedback, wherein the score reflects an accuracy of the at least a first output in addressing the received first query of the plurality of queries and wherein generating the score using the evaluation model further comprises:

receiving a chatbot training dataset, wherein the chatbot training dataset correlates a plurality of historical output data to a plurality of historical subsequent query data;

training, iteratively, the evaluation model using the chatbot training dataset, wherein training the evaluation model includes retraining the evaluation model with feedback from previous iterations of the evaluation model;

generate the score using the retrained evaluation model; and recommend adjustments to improve future output of the evaluation model;

adjust, within the question data structure, at least the weight associated with the at least a first output;

select, from the question data structure, a plurality of questions, wherein the plurality of questions comprises a first question having a highest weight within the data structure and a successive question having a second highest weight within the question data structure; and display, using a downstream device communicatively connected to the computing device, the first question followed temporally by the second question.

2. The apparatus of claim 1, wherein the processor is further configured to process, using an image processor, the multimodal data by:

receiving image data;

identifying one or more features within the image data;

determining a correlation between the one or more features and the successive question;

generating a processed image output based on the correlation; and displaying, using the downstream device, the at least a first output comprising the processed image output.

3. The apparatus of claim 1, wherein the at least a processor is configured to utilize a first application programming interface, wherein the application programming interface is configured to:

authenticate user credentials associated with the user profile;

access, using the authenticated user credentials, a data repository;

retrieve the multimodal data comprising a plurality of electronic records from the data repository; and transmit the plurality of electronic records to the chatbot, wherein the chatbot is configured to generate the at least a first output.

4. The apparatus of claim 3, wherein the at least a processor is configured to utilize a second application programming interface, wherein the application programming interface is configured to:

identify, using a node protocol, an optimal node of an edge system;

establish a connection to the optimal node of the edge system;

process, using the optimal node, the multimodal data;

generate, using the optimal node, the plurality of outputs; and transmit the plurality of outputs to the downstream device.

5. The apparatus of claim 4, wherein the node protocols comprise choosing the optimal node as a function of geolocation data.

6. The apparatus of claim 4, wherein the at least a processor is configured to utilize a third application programming interface, wherein the application programming interface is configured to:

establish a cloud computing connection to a remote data center;

receive multimodal data from the remote data center as a function of the first query; and transmit processed data to the chatbot from the remote data center.

7. The apparatus of claim 1, wherein the chatbot comprises a machine learning model, wherein the machine learning model is iteratively trained on the chatbot training dataset.

8. The apparatus of claim 1, wherein the chatbot further comprises a large language model, wherein the large language model is configured to:

receive the multimodal data;

processes the multimodal data using a trained neural network, wherein processing comprises:

extracting, using embedding techniques, at least an attribute from the multimodal data;

identifying, using the at least an attribute, at least a pattern from the multimodal data; and generating, using the at least a pattern, return data;

generate, using the return data, the at least a first output of the plurality of outputs.

9. The apparatus of claim 1, further comprising:

identifying, using the evaluation model, recalibration data comprising a variance from target output, wherein the variance is derived from the score; and retraining, the evaluation model, using the recalibration data.

10. The apparatus of claim 1, wherein the at least a first output of the plurality of outputs comprises at least a resource.

11. A method for generating resource output as a function of a plurality of queries and multimodal data, wherein the method comprises:

receiving, using the at least a processor, the multimodal data associated with a user profile, wherein the multimodal data comprises passive data and active data, wherein receiving the multimodal data associated with the user profile comprises retrieving passive data using a web-crawler as a function of user data;

receiving, using a chatbot, a first query of the plurality of queries;

generating, using the chatbot, at least a first output of a plurality of outputs as a function of the first query and the multimodal data, wherein the plurality of outputs comprises a question data structure, wherein the question data structure comprises each output associated with a weight which comprises a relevance of the at least a first output;

generating, using an evaluation model, a score associated with the at least a first output using system feedback, wherein the score reflects an accuracy of the at least a first output in addressing the received first query of the plurality of queries and wherein generating the score using the evaluation model further comprises:

receiving a chatbot training dataset, wherein the chatbot training dataset correlates a plurality of historical output data to a plurality of historical subsequent query data;

training, iteratively, the evaluation model using the chatbot training dataset, wherein training the evaluation model includes retraining the evaluation model with feedback from previous iterations of the evaluation model;

generate the score using the retrained evaluation model; and recommend adjustments to improve future output of the evaluation model;

adjusting, within the question data structure, at least the weight associated with the at least a first output;

selecting, from the question data structure, a plurality of questions, wherein the plurality of questions comprises a first question having a highest weight within the data structure and a successive question having a second highest weight within the question data structure; and displaying, using a downstream device communicatively connected to the computing device, the first question followed temporally by the second question.

12. The method of claim 11, wherein the processor is further configured to process, using an image processor, the multimodal data by:

receiving image data;

identifying one or more features within the image data;

determining a correlation between the one or more features and the successive question;

generating a processed image output based on the correlation; and displaying, using the downstream device, the at least a first output comprising the processed image output.

13. The method of claim 11, wherein the at least a processor is configured to utilize a first application programming interface, wherein the application programming interface is configured to:

authenticate user credentials associated with the user profile;

access, using the authenticated user credentials, a data repository;

retrieve the multimodal data comprising a plurality of electronic records from the data repository; and transmit the plurality of electronic records to the chatbot, wherein the chatbot is configured to generate the at least a first output.

14. The method of claim 13, wherein the at least a processor is configured to utilize a second application programming interface, wherein the application programming interface is configured to:

identify, using a node protocol, an optimal node of an edge system;

establish a connection to the optimal node of the edge system;

process, using the optimal node, the multimodal data;

generate, using the optimal node, the plurality of outputs; and transmit the plurality of outputs to the downstream device.

15. The method of claim 14, wherein the node protocols comprise choosing the optimal node as a function of geolocation data.

16. The method of claim 14, wherein the at least a processor is configured to utilize a third application programming interface, wherein the application programming interface is configured to:

establish a cloud computing connection to a remote data center;

receive multimodal data from the remote data center as a function of the first query; and transmit processed data to the chatbot from the remote data center.

17. The method of claim 11, wherein the chatbot comprises a machine learning model, wherein the machine learning model is iteratively trained on the chatbot training dataset.

18. The method of claim 11, wherein the chatbot further comprises a large language model, wherein the large language model is configured to:

receive the multimodal data;

processes the multimodal data using a trained neural network, wherein processing comprises:

extracting, using embedding techniques, at least an attribute from the multimodal data;

identifying, using the at least an attribute, at least a pattern from the multimodal data; and generating, using the at least a pattern, return data;

generate, using the return data, the at least a first output of the plurality of outputs.

19. The method of claim 11, further comprising:

identifying, using the evaluation model, recalibration data comprising a variance from target output, wherein the variance is derived from the score; and retraining, the evaluation model, using the recalibration data.

20. The method of claim 11, wherein the at least a first output of the plurality of outputs comprises at least a resource.

* * * * *